US012018821B1

(12) United States Patent
Chen

(10) Patent No.: US 12,018,821 B1
(45) Date of Patent: Jun. 25, 2024

(54) FIREWORK LIGHT

(71) Applicant: Linhai Shanying Lighting Co., LTD., Taizhou (CN)

(72) Inventor: Chaohui Chen, Shanghai (CN)

(73) Assignee: Linhai Shanying Lighting Co., LTD., Taizhou (CN)

( * ) Notice: Subject to any disclaimer, the term of this patent is extended or adjusted under 35 U.S.C. 154(b) by 0 days.

(21) Appl. No.: 18/118,185

(22) Filed: Mar. 7, 2023

(51) Int. Cl.
*F21V 19/00* (2006.01)
*F21V 31/00* (2006.01)

(52) U.S. Cl.
CPC ........ *F21V 19/0075* (2013.01); *F21V 31/005* (2013.01)

(58) Field of Classification Search
CPC ........................... F21V 19/0075; F21V 31/005
See application file for complete search history.

(56) References Cited

U.S. PATENT DOCUMENTS 6,312,141 B1 * 11/2001 Liu ......................... F21S 10/06 40/442
6,582,115 B2 * 6/2003 Huang .................... F21V 21/10 362/559
6,709,145 B1 * 3/2004 Huang .................... F21S 10/06 362/249.17
8,128,259 B2 * 3/2012 Myers ....................... F21V 3/02 362/249.14
2003/0016544 A1 * 1/2003 Huang .................... F21V 21/10 362/249.16
2003/0156411 A1 * 8/2003 Ahroni ...................... F21S 2/00 362/249.01
2004/0190309 A1 * 9/2004 Bixler ....................... F21S 4/20 362/565
2005/0231975 A1 * 10/2005 Bixler .................... A47G 33/08 362/565
2022/0065429 A1 * 3/2022 Xie ........................... F21S 4/20

* cited by examiner

*Primary Examiner* — Tsion Tumebo
(74) *Attorney, Agent, or Firm* — Bay State IP, LLC

(57) ABSTRACT

The present disclosure relates to the technical field of lamps and lanterns, and provides a firework light. The firework light includes a housing, first connecting assemblies, second connecting assemblies and light tube assemblies. The housing is arranged as a sphere. A plurality of connecting assemblies are provided. The first connecting assemblies are connected with the housing. The interiors of the first connecting assemblies communicate with the interior of the housing to form an accommodating cavity. A plurality of second connecting assemblies are provided. The second connecting assemblies are arranged in the accommodating cavity formed by the first connecting assemblies and the housing. A plurality of light tube assemblies are provided. The light tube assemblies are arranged corresponding to the first connecting assemblies. The light tube assemblies are detachably and fixedly connected with the housing through the corresponding first connecting assemblies.

5 Claims, 8 Drawing Sheets

FIREWORK LIGHT

TECHNICAL FIELD

The present disclosure relates to the technical field of lamps and lanterns, in particular to a firework light.

BACKGROUND

The firework light is a novel simulated landscape light, and is generally a semiconductor (LED) solid-state light-emitting device. The firework light has the advantages of extremely low calorific value, long service life, safety and reliability, shock and vibration resistance. The advantages are almost impossible for all other light sources, and are also the outstanding performances of the firework light. The firework light also has the characteristics of environmental protection, long service life and attractive appearance. The firework light is widely used in squares, courtyards, leisure squares, lobbies and other places. The characteristics of energy conservation and durability make up for the shortcomings of traditional landscape lights. The firework light is a revolutionary product of similar lamps and lanterns.

The applicant finds that at least the following technical problems exist in the prior art: the light tube of a traditional firework light product is non-replaceable, disposable, poor in waterproof grade and single in light function.

SUMMARY

The present disclosure aims to provide a firework light, and at least solves the technical problem in the prior art that the light tube is non-replaceable and poor in waterproof performance Various technical effects generated by a preferred technical scheme in various technical schemes provided by the present disclosure are explained in detail as follow.

In order to achieve the above-mentioned purpose, the present disclosure provides the following technical scheme.

A firework light is provided according to some embodiments of the present disclosure, including:

a housing, the housing being arranged as a sphere;

a plurality of first connecting assemblies, the first connecting assemblies being connected with the housing, and the interiors of the first connecting assemblies communicating with the interior of the housing to form an accommodating cavity;

a plurality of second connecting assemblies, the second connecting assemblies being arranged in the accommodating cavity formed by the first connecting assemblies and the housing; and a plurality of light tube assemblies, the light tube assemblies being arranged corresponding to the first connecting assemblies, and the light tube assemblies being detachably and fixedly connected with the housing through the corresponding first connecting assemblies.

According to the firework light provided by some embodiments of the present disclosure, a cavity is formed in the interior of the housing, a plurality of through holes are formed in the surface of the housing, and the through holes communicate with the cavity inside the housing.

According to the firework light provided by some embodiments of the present disclosure, the housing includes a first hemisphere and a second hemisphere, the first hemisphere and the second hemisphere are detachably and fixedly connected, and the through holes are uniformly distributed on the first hemisphere and the second hemisphere at intervals.

According to the firework light provided by some embodiments of the present disclosure, connecting lugs are arranged on the first hemisphere and the second hemisphere.

According to the firework light provided by some embodiments of the present disclosure, the first connecting assemblies are respectively and correspondingly arranged at the through holes in the surface of the housing, and the first connecting assembly includes a bolt tube, a bolt tube fastening nut and a light tube locking nut; and one end of the bolt tube is fixedly connected with the hole wall of the through hole, and the bolt tube fastening nut and the light tube locking nut sleeve the outside of the bolt tube.

According to the firework light provided by some embodiments of the present disclosure, the light tube assembly includes a light tube, a connecting waterproof cap, a waterproof tail cap and an anti-skid tube; and the connecting waterproof cap is arranged at one end of the light tube, the waterproof tail cap is arranged at the end, away from the connecting waterproof cap, of the light tube, the anti-skid tube sleeves the outside of the light tube, the anti-skid tube is arranged at the end, close to the connecting waterproof cap, of the connecting waterproof cap, the end, provided with the connecting waterproof cap, of the light tube can be embedded into the interior of the bolt tube, and the light tube and the bolt tube can be detachably and fixedly connected by the light tube locking nut.

According to the firework light provided by some embodiments of the present disclosure, the firework light further includes second connecting assemblies, wherein the second connecting assembly includes a first connector, a second connector, a sealing ring and a fixed nut, the first connector and the second connector are detachably and fixedly connected, the sealing ring is arranged at the joint of the first connector and the second connector, and the fixed nut sleeves the outside of the first connector.

According to the firework light provided by some embodiments of the present disclosure, a plurality of first connectors are provided, the first connectors are integrated into the accommodating cavity inside the housing to form a light strip connecting assembly, and the second connector is arranged corresponding to the first connector.

According to the firework light provided by some embodiments of the present disclosure, an input male plug connector is arranged at one end of the light strip connecting assembly, the input male plug connector is detachably and fixedly connected with one end of a master control female plug connector, the other end of the master control female plug connector is connected with one end of a transformer through a controller, and the other end of the transformer is connected with a power supply.

According to the firework light provided by some embodiments of the present disclosure, the firework light further includes a mounting assembly, wherein the mounting assembly is fixedly arranged outside the housing, and an opening communicating with the accommodating cavity inside the housing is formed in the mounting assembly.

One or more technical schemes in the embodiment of the present disclosure at least have one of the following technical effects.

The housing, as the shell of the firework light, is of an approximately spherical structure. The first connecting assembly is arranged on the housing. The cavity inside the first connecting assembly and the cavity inside the housing form the accommodating cavity. Wires and other connectors are placed in the accommodating cavity. The light tube is detachably fixed on the housing through the first connector, so that the light tube is detachable. A luminous body is arranged inside the light tube, the luminous body can be hidden in the accommodating cavity through the second connecting assembly, and the second connecting assembly can be detachably and fixedly connected, so that the luminous body and the integrated wire can form a detachable circuit structure. The light tube and the internal assemblies of the light tube can be detachably replaced, and the firework light can be reused.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may derive other drawings from these accompanying drawings without creative efforts.

Figure 1:
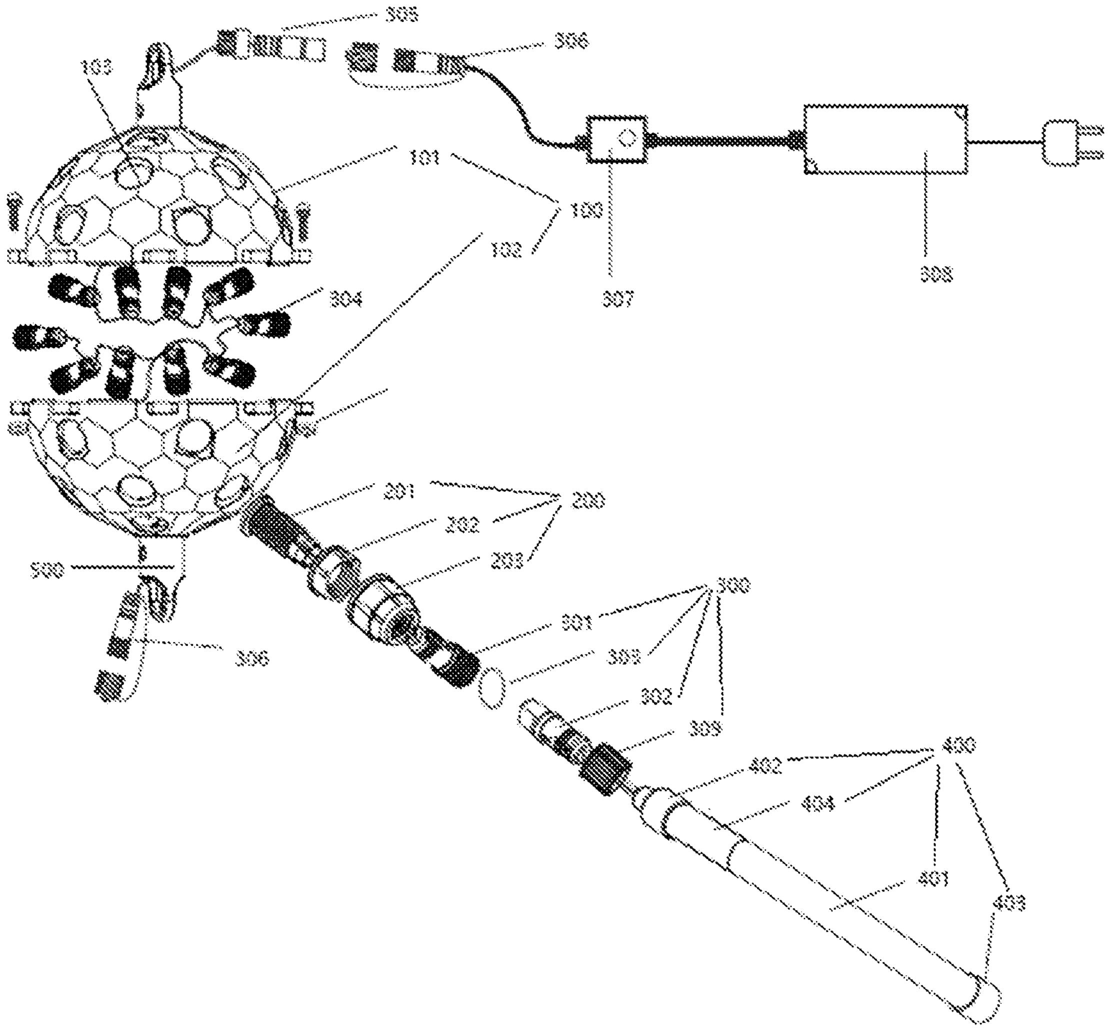
FIG. 1 is an explosive view of a firework light provided by some embodiments of the present disclosure.

Reference signs: 100, housing; 101, first hemisphere; 102, second hemisphere; 103, through hole; 200, first connecting assembly; 201, bolt tube; 202, bolt tube fastening nut; 203, light tube locking nut; 300, second connecting assembly; 301, first connector; 302, second connector; 303, sealing ring; 304, light strip connecting assembly; 305, input male plug connector; 306, master control female plug connector; 307, controller; 308, transformer; 309, fixed nut; 400, light tube assembly; 401, light tube; 402, connecting waterproof cap; 403, waterproof tail cap; 404, anti-skid tube; and 500, mounting assembly.

DETAILED DESCRIPTION OF THE EMBODIMENTS

In order to make the purpose, technical scheme and advantages of the present disclosure more clear, the technical scheme of the present disclosure is described in detail as follows. Apparently, the embodiments in the following description are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

As shown in FIG. 1 to FIG. 14, in some embodiments, a firework light is provided according to some embodiments of the present disclosure, including a housing 100, first connecting assemblies 200, second connecting assemblies 300 and light tube assemblies 400.

The housing 100 is arranged in a sphere shape. The housing 100 is of a rigid housing structure. The surface of the housing 100 is of a sphere structure composed of a plurality of regular hexagons, and the outer surface is a mirror surface. The viewer has more fresh feelings for the spherical structure composed of regular hexagons compared with the traditional smooth spherical structure. The outer surface is made into a mirror surface, and a metal texture can be visually created, so that the appearance is more attractive. At the same time, the assemblies such as light tubes are also convenient to mount on the outer surface.

A plurality of first connecting assemblies 200 are provided. The first connecting assemblies 200 are connected with the housing 100. The interiors of the first connecting assemblies 200 communicate with the interior of the housing 100 to form an accommodating cavity.

The interior of the first connecting assembly 200 and the interior of the housing 100 are both of hollow cavities. The accommodating cavity formed by connecting the first connecting assembly 200 and the housing 100 is used for placing components such as electric wires and plugs.

A plurality of second connecting assemblies 300 are provided. The second connecting assemblies 300 are arranged in the accommodating cavity formed by the first connecting assemblies 200 and the housing 100.

The firework light is provided with a plurality of luminous bodies. The luminous bodies are connected by the second connecting assemblies 300. The joint is hidden in the accommodating cavity, so that the overall dustproof and waterproof effect can be improved.

A plurality of light tube assemblies 400 are provided. The light tube assemblies 400 are arranged corresponding to the first connecting assemblies 200. The light tube assemblies 400 are detachably and fixedly connected with the housing 100 through the corresponding first connecting assemblies 200.

Wherein, the luminous body of the firework light is arranged in the light tube assembly 400. The light tube assembly is detachably fixed through the first connecting assembly 200, so that the light tube and the luminous body of the firework light can be replaced, and are convenient to reuse.

Figure 2:
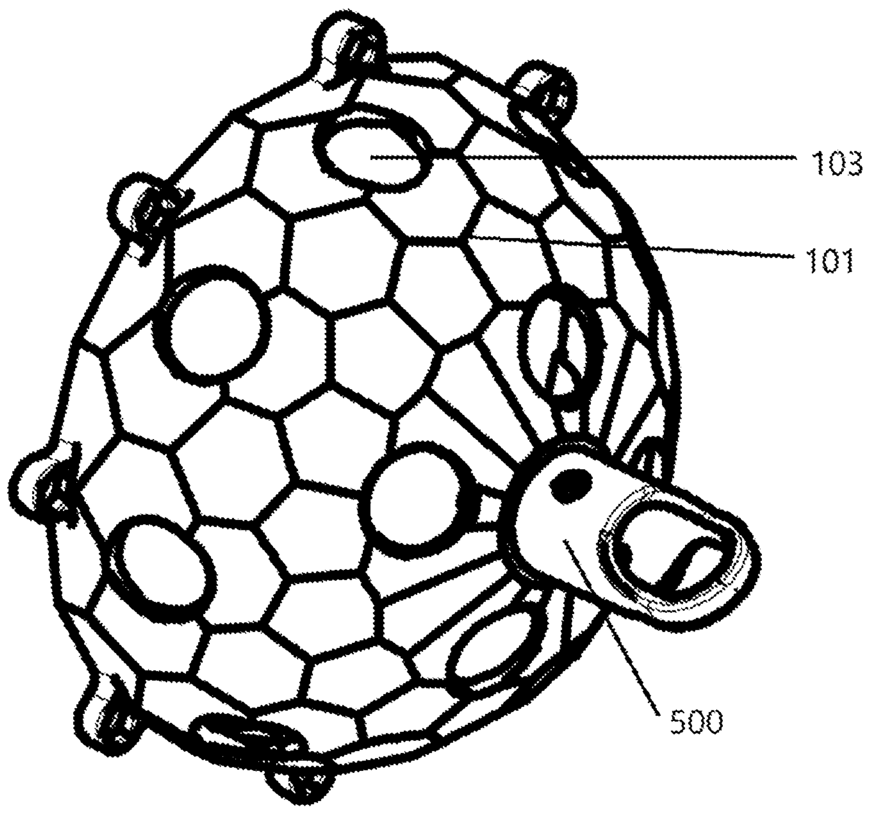
FIG. 2 is a schematic diagram of a first hemisphere by some embodiments of the present disclosure.

As shown in FIG. 1 to FIG. 2, according to the firework light provided by some embodiments of the present disclosure, a cavity is formed in the interior of the housing 100, a plurality of through holes 103 are formed in the surface of the housing 100, and the through holes 103 communicate with the cavity inside the housing 100.

Wherein, a plurality of through holes 103 are uniformly formed in the surface of the housing 100 at intervals. In some embodiments, the through holes 103 are formed in a circular shape, thereby facilitating to mount the first connecting assembly 200 in the through hole 103.

As shown in FIG. 1 to FIG. 2, according to the firework light provided by some embodiments of the present disclosure, the housing 100 includes a first hemisphere 101 and a second hemisphere 102, the first hemisphere 101 and the second hemisphere are detachably and fixedly connected, and the through holes are 103 uniformly distributed 102 on the first hemisphere 101 and the second hemisphere 102 at intervals.

Referring to FIG. 2, the first hemisphere 101 has the same structure as the second hemisphere 102. The through holes are uniformly formed in the surface of the hemisphere at intervals. When the first hemisphere 101 is separated from the second hemisphere 102, the circuit and other connectors of the light can be hidden in the accommodating cavity. In specific implementation, connecting lugs are arranged on the first hemisphere 101 and the second hemisphere 102. When the first hemisphere 101 and the second hemisphere 102 are buckled together, the connecting lug of the first hemisphere 101 corresponds to that of the second hemisphere 102 in positions. The bolt may pass through the connecting lug of the first hemisphere 101 and the connecting lug of the second hemisphere 102. The threaded rod of the bolt extends to the outside of the connecting lug and is fixed by a nut. In some other embodiments, the connection between the first hemisphere 101 and the second hemisphere 102 is not limited to the connection between the bolt and the connecting lug, and also includes other connection modes such as adhesive connection or buckled connection.

According to the firework light provided by some embodiments of the present disclosure, the first connecting assemblies 200 are respectively and correspondingly arranged at the through holes 103 in the surface of the housing 100, and the first connecting assembly 200 includes a bolt tube 201, a bolt tube fastening nut 202 and a light tube locking nut 203.

One end of the bolt tube 201 is fixedly connected with the hole wall of the through hole 103, and the bolt tube fastening nut 202 and the light tube locking nut 203 sleeve the outside of the bolt tube 201.

Figure 4:
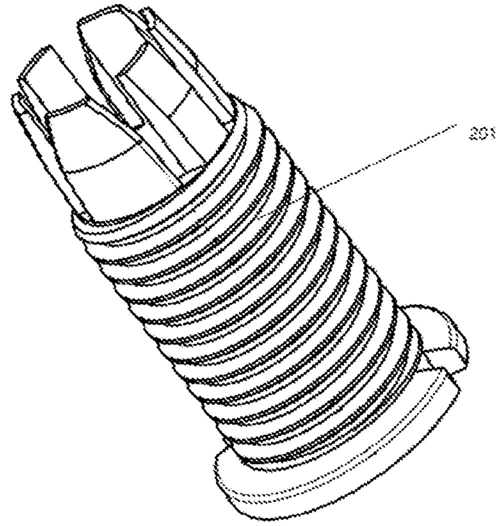
FIG. 4 is a schematic diagram of a bolt tube provided by some embodiments of the present disclosure.

In specific implementation, referring to FIG. 1 and FIG. 4, threads are arranged outside the bolt tube 201. A longitudinal opening along the axial direction is formed in one end of the bolt tube 201. The end, away from the longitudinal opening, of the bolt tube 201 can be embedded into the through hole 102 and fixedly connected with the hole wall of the through hole 103. The number and positions of the bolt tubes 201 correspond to those of the through holes 103.

Figure 3:
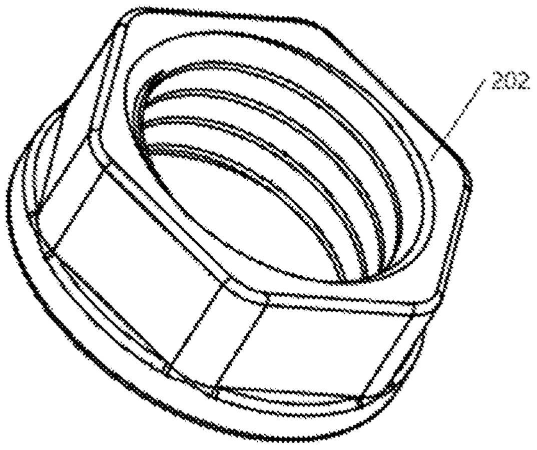
FIG. 3 is a schematic diagram of a bolt tube fastening nut provided by some embodiments of the present disclosure.
Figure 5:
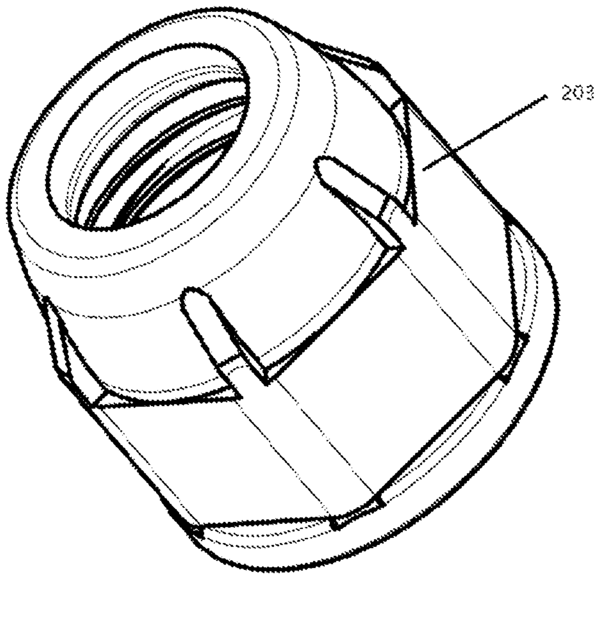
FIG. 5 is a schematic diagram of a light tube locking nut provided by some embodiments of the present disclosure.
Figure 6:
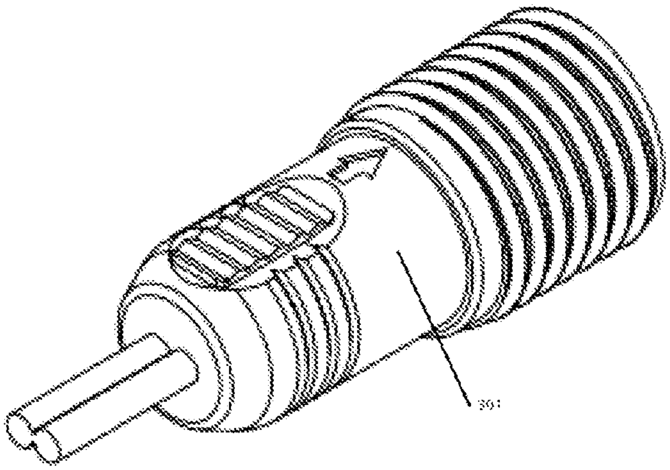
FIG. 6 is a schematic diagram of a first connector provided by some embodiments of the present disclosure.
Figure 7:
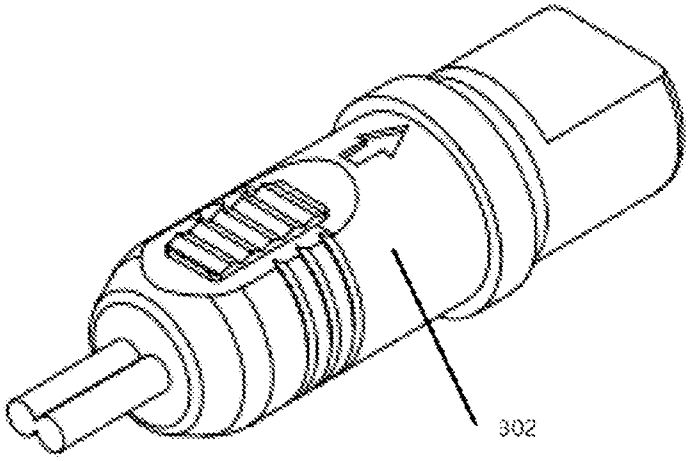
FIG. 7 is a schematic diagram of a second connector provided by some embodiments of the present disclosure.
Figure 8:
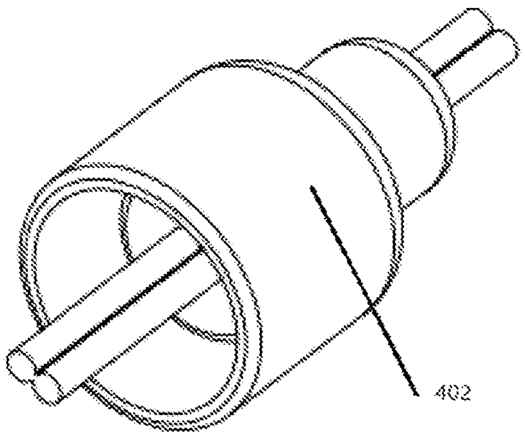
FIG. 8 is a schematic diagram of a connecting waterproof cap provided by some embodiments of the present disclosure.
Figure 9:
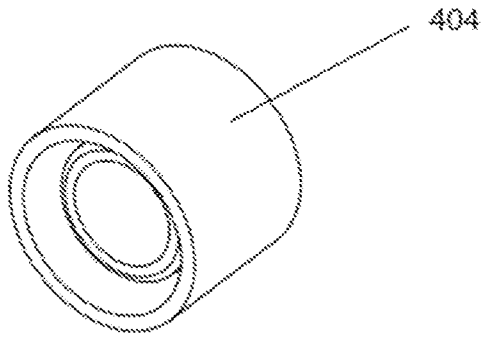
FIG. 9 is a schematic diagram of a waterproof tail cap provided by some embodiments of the present disclosure.

Referring to FIG. 1, FIG. 3, and FIG. 5, after the bolt tube 201 is fixed, the bolt tube fastening nut 202 sleeves the outside of the bolt tube 201 to be further fixed, and the light tube assembly 400 is fixed by the light tube locking nut 203 when the light tube assembly 400 is inserted into the bolt tube 201.

According to the firework light provided by some embodiments of the present disclosure, the light tube assembly 400 includes a light tube 401, a connecting waterproof cap 402, a waterproof tail cap 403 and an anti-skid tube 404.

Referring to FIG. 1, FIG. 8 to FIG. 11 and FIG. 14, the connecting waterproof cap 402 is arranged at one end of the light tube 401. The waterproof tail cap 403 is arranged at the end, away from the connecting waterproof cap 402, of the light tube 401. The anti-skid tube 404 sleeves the outside of the light tube 401. The anti-skid tube 404 is arranged at the end, close to the connecting waterproof cap 402, of the connecting waterproof cap 404. The end, provided with the connecting waterproof cap 402, of the light tube 401 can be embedded into the interior of the bolt tube 201. The light tube 401 and the bolt tube 201 can be detachably and fixedly connected by the light tube locking nut 203. The joint between the light tube 401 and the connecting waterproof cap 402 is sealed by epoxy resin.

In specific implementation, the tube wall of the light tube 401 is made of a transparent material. Preferably, the anti-skid tube 404 may also be made of a transparent material. The light tube 401 is internally provided with assemblies such as a luminous body PCB board. The wires can pass through the connecting waterproof cap 402 to enable the luminous body inside the light tube 401 to be electrified.

The firework light provided by some embodiments of the present disclosure further includes second connecting assemblies 300. The second connecting assembly 300 includes a first connector 301, a second connector 302, a sealing ring 303 and a fixed nut 309. The first connector 301 and the second connector 302 are detachably and fixedly connected. The sealing ring 303 is arranged at the joint of the first connector 301 and the second connector 302. The fixed nut 309 sleeves the outside of the first connector 301.

Figure 10:
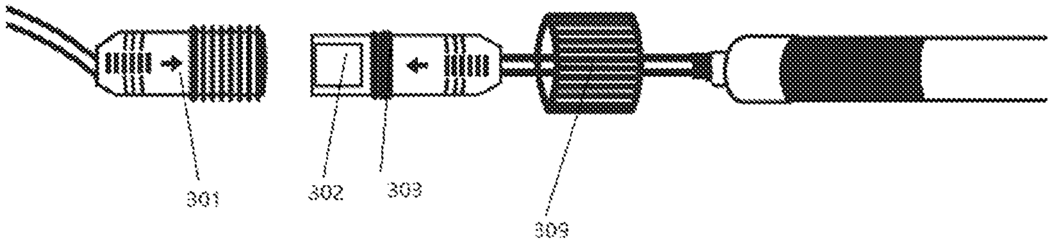
FIG. 10 is a structural schematic diagram when the first connector and the second connector are separated provided by some embodiments of the present disclosure.
Figure 11:
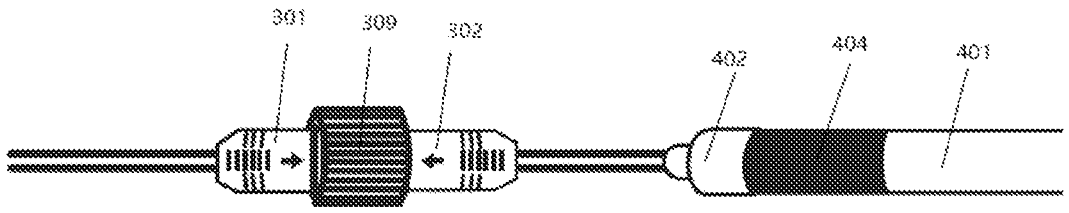
FIG. 11 is a structural schematic diagram when the first connector and the second connector are connected together provided by some embodiments of the present disclosure.

Referring to FIG. 1, the first connector 301 is a female plug connector, and is externally provided with threads and internally provided with a slot. The second connector 302 is a male plug connector. In specific implementation, the second connector 302 can be inserted into the plug of the first connector 301. Referring to FIG. 10, the sealing ring 303 sleeves the outside of the second connector 302. When the second connector 302 is inserted into the interior of the first connector 301, the sealing ring 303 blocks the gap at the connector. Through the external threads of the first connector 301 by the fixed nut 309, the fixed nut 309 is fixed to the outside of the first connector 301. The fixed nut 309 is sealed by epoxy resin. Through the sealing ring 303 and the fixed nut 309, the interior of the first connector 301 is sealed to achieve the waterproof and dustproof effects. The state after the first connector 301 and the second connector 302 are connected is shown in FIG. 11. The end, away from the first connector 301, of the second connector 302 is connected with the luminous body PCB board. The luminous body PCB board is embedded into the interior of the light tube 401. Both ends of the light tube 401 are sealed by the waterproof cap 402 and the waterproof tail cap 403, so that the interior of the light tube 401 is sealed to achieve a waterproof effect.

Figure 12:
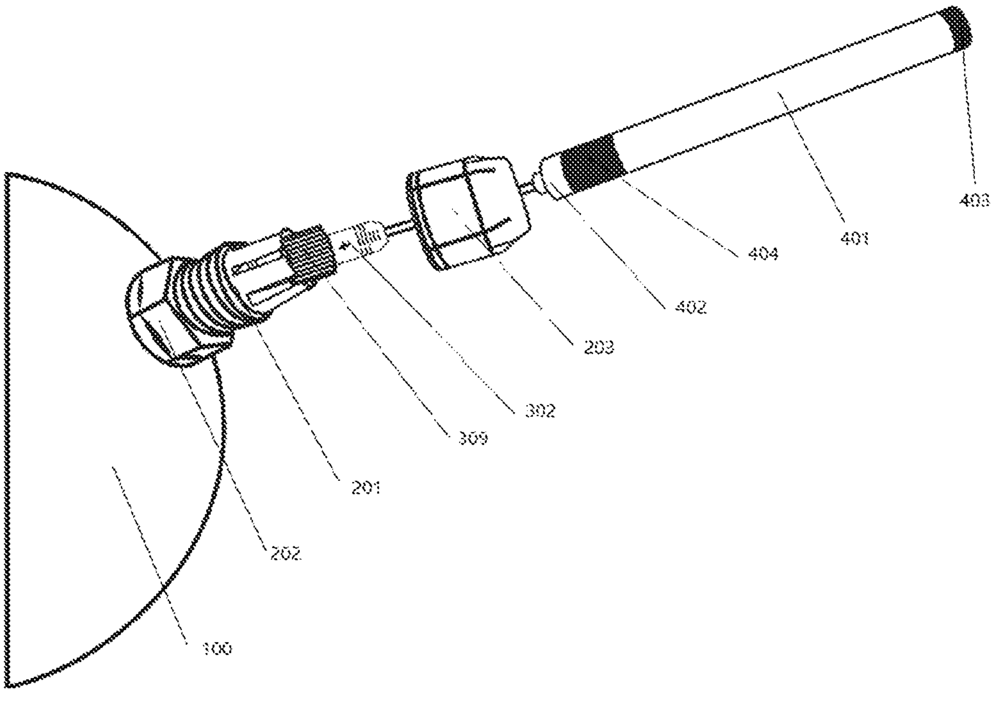
FIG. 12 is a structural schematic diagram when a bolt tube and a light tube are separated provided by some embodiments of the present disclosure.
Figure 13:
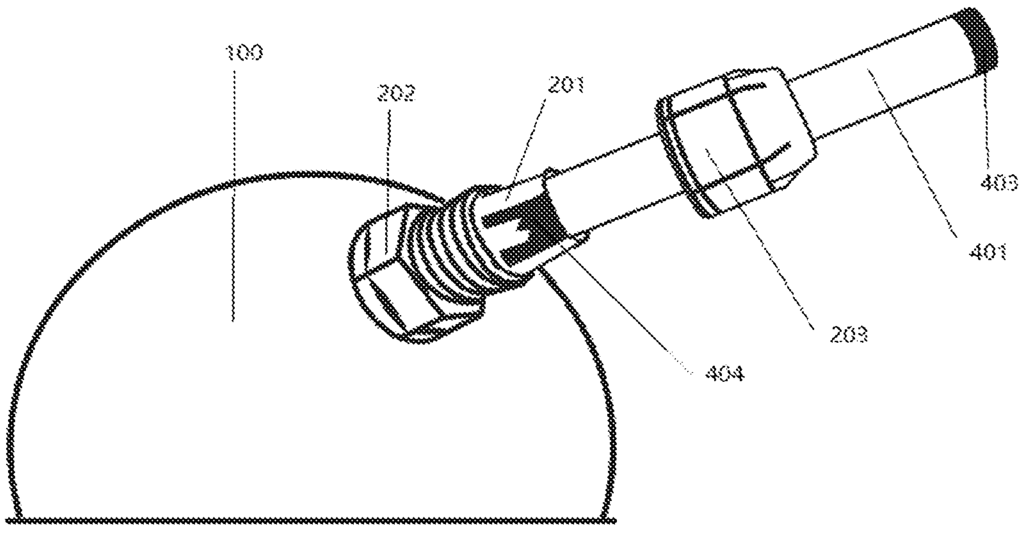
FIG. 13 is a structural schematic diagram when a light tube is inserted into the interior of the bolt tube provided by some embodiments of the present disclosure.

When the firelight light is mounted, referring to FIG. 12, the second connecting assembly 300 is inserted into the interior of the accommodating cavity from the opening of the bolt tube 201. Finally, the light tube 401 is inserted into the interior of the bolt tube 201. At this time, the light tube locking nut 203 is fixed to the outside of the bolt tube 201 by threads. At this time, the opening of the bolt tube 201 is pressed by the light tube locking nut 203. In some embodiments, the bolt tube 201 is made of plastic, and the opening of the bolt tube 201 can be slightly deformed under the pressing action of the light tube locking nut 203, and the anti-skid tube 404 for fixing the outside of the light tube 401 is clamped, so that a detachable fixing mode for the light tube 401 is achieved. The position of the light tube 401 after being fixed is shown in FIG. 13.

According to the firework light provided by some embodiments of the present disclosure, a plurality of first connectors 301 are provided, the first connectors 301 are integrated into the accommodating cavity inside the housing 100 to form a light strip connecting assembly 304, and the second connector 302 is arranged corresponding to the first connector 301.

Figure 14:
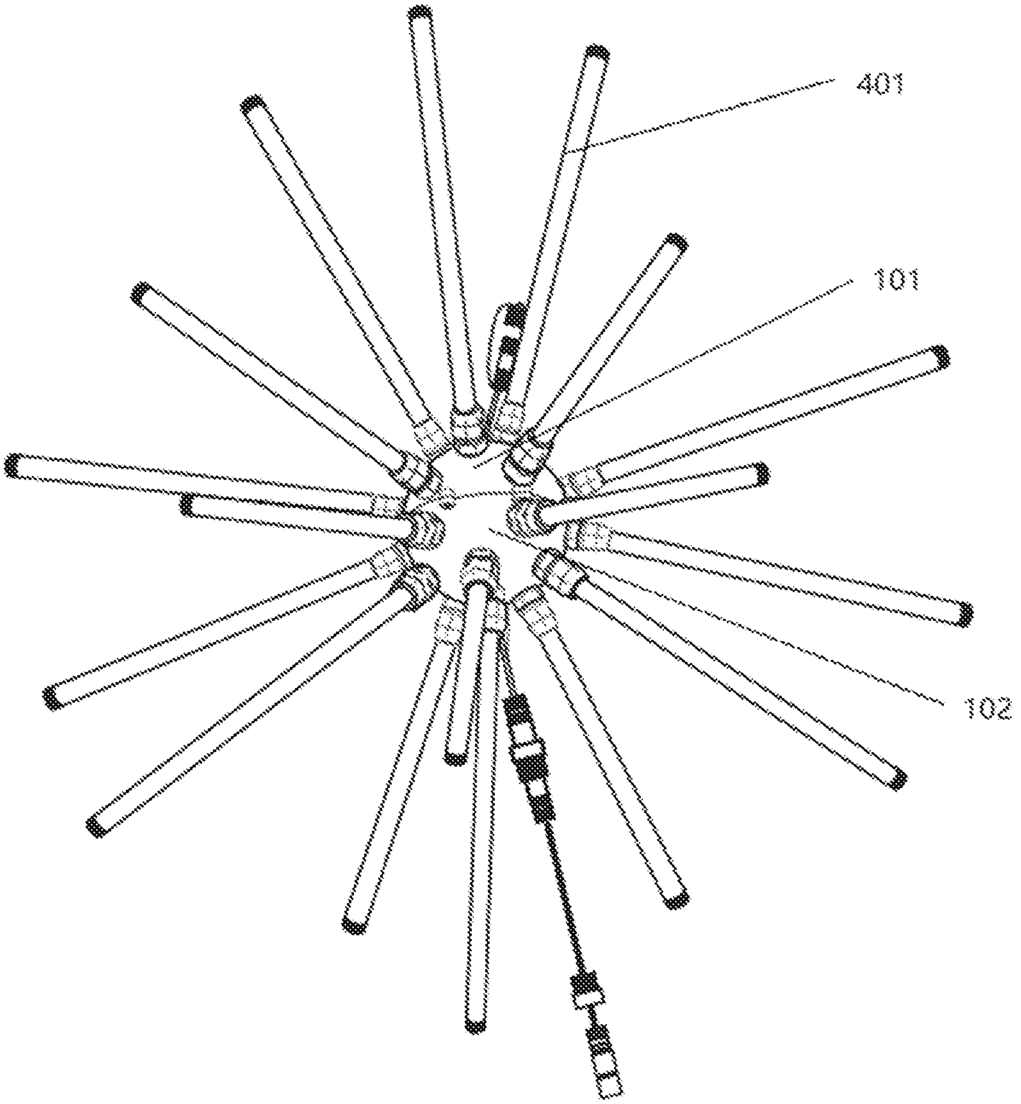
FIG. 14 is an external structural schematic diagram of a firework light provided by some embodiments of the present disclosure.

Referring to FIG. 1, the light strip connecting assembly 304 is formed by connecting a plurality of first connectors 301 by lines. In specific implementation, referring to FIG. 1, a plurality of light tube assemblies 400 are connected with the first connector 301 on the light strip connecting assembly 304 through the second connector 302. The positions of the light tube assemblies 400 are fixed to the through holes 103 in the housing 100 through the first connecting assembly 200. The state of the light tube assembly 400 after being fixed is shown in FIG. 14.

According to the firework light provided by some embodiments of the present disclosure, an input male plug connector 305 is arranged at one end of the light strip connecting assembly 304. The input male plug connector 305 is detachably and fixedly connected with one end of a master control female plug connector 306. The other end of the master control female plug connector 306 is connected with one end of a transformer 308 through a controller 307. The other end of the transformer 308 is connected with a power supply.

Referring to FIG. 1, when in use, electric current is supplied by the power supply. The electric current is supplied to the light strip connecting assembly 304 through the transformer 308, the controller 307, the input male plug connector 305 and the master control female plug connector 306. The first connector 301 mounted on the light strip connecting assembly 304 is connected with the corresponding second connector 302, and then electric current is supplied to the luminous body connected to the second connector 302, so that the firework light is lightened.

In some embodiments, the color and brightness of the light can be controlled by the controller 307 and software on the handset or other devices.

According to the firework light provided by some embodiments of the present disclosure, the firework light further includes a mounting assembly 500, wherein the mounting assembly 500 is fixedly arranged outside the housing 100, and an opening communicating with the accommodating cavity inside the housing 100 is formed in the mounting assembly 500.

In some embodiments, the mounting assembly 500 is fixed to the exterior of the housing 100. Referring to FIG. 1, preferably, on the first hemisphere 101 and the second hemisphere 102, the mounting assembly 500 is located in the middle of the outer surface of the hemisphere. The mounting assembly 500 is arranged in an approximately cylindrical manner. A cavity communicating with the accommodating cavity is formed in the interior of the mounting assembly 500. Openings communicating with the outside are formed in both sides at the ends. In specific implementation, the mounting assembly 500 can be externally connected with a hollow fixed rod and a base. The mounting assembly 500 can be inserted into an externally connected hollow fixed rod, and is fixedly connected by bolts or other means. The other end of the fixed rod is connected with the base. A plurality of connecting rods can be arranged between the mounting assembly 500 and the base. A plurality of connecting rods can be connected end to end. Wherein, the externally connected hollow fixed rod includes a rod body with a fixed length or a rod body structure capable of telescoping. Wires can pass through the interior of the hollow fixed rod for supplying power to the luminous body inside the firework light. In other embodiments, the mounting assembly 500 can form a suspended firework light by means of knots or hooks, and the mounting assembly 500 is connected in different ways to meet different use scenarios, so that the application range is larger.

In the description of the present disclosure, it needs to be illustrated that, except as otherwise noted, the meaning of "a plurality of" is two or more than two; and the indicative direction or position relations of the terms such as "upper", "lower", "left", "right", "inside", "outside", "front end", "rear end", "head" and "tail" are direction or position relations illustrated based on the accompanying diagrams, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, the terms such as "first", "second", and "third" are just used for distinguishing the description, but cannot be understood to indicate or hint relative importance.

In the description of the present disclosure, it further needs to be illustrated that, except as otherwise noted, the terms such as "mount", "link" and "connect" should be generally understood. For example, the components can be fixedly connected, and also can be detachably connected or integrally connected; the components can be mechanically connected, and also can be electrically connected; and the components can be directly connected, and also can be indirectly connected through an intermediate. For those skilled in the art, the specific meanings of the terms in the present disclosure can be understood according to specific conditions.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A firework light, comprising:

a housing, the housing being arranged as a sphere;

a plurality of first connecting assemblies, the first connecting assemblies being connected with the housing, and the interiors of the first connecting assemblies communicating with the interior of the housing to form an accommodating cavity;

a plurality of second connecting assemblies, the second connecting assemblies being arranged in the accommodating cavity formed by the first connecting assemblies and the housing;

a plurality of light tube assemblies, the light tube assemblies being arranged corresponding to the first connecting assemblies, and the light tube assemblies being detachably and fixedly connected with the housing through the corresponding first connecting assemblies;

wherein a cavity is formed in the interior of the housing, a plurality of through holes are formed in the surface of the housing, and the through holes communicate with the cavity inside the housing;

wherein the housing comprises a first hemisphere and a second hemisphere, the first hemisphere and the second hemisphere are detachably and fixedly connected, and the through holes are uniformly distributed on the first hemisphere and the second hemisphere at intervals;

wherein connecting lugs are arranged on the first hemisphere and the second hemisphere;

wherein the first connecting assemblies are respectively and correspondingly arranged at the through holes in the surface of the housing, and the first connecting assembly comprises a bolt tube, a bolt tube fastening nut and a light tube locking nut;

wherein one end of the bolt tube is fixedly connected with the hole wall of the through hole, and the bolt tube fastening nut and the light tube locking nut sleeve the outside of the bolt tube;

wherein the light tube assembly comprises a light tube, a connecting waterproof cap, a waterproof tail cap and an anti-skid tube; and wherein the connecting waterproof cap is arranged at one end of the light tube, the waterproof tail cap is arranged at the end, away from the connecting waterproof cap, of the light tube, the anti-skid tube sleeves the outside of the light tube, the anti-skid tube is arranged at the end, close to the connecting waterproof cap, of the connecting waterproof cap, the end, provided with the connecting waterproof cap, of the light tube can be embedded into the interior of the bolt tube, and the light tube and the bolt tube can be detachably and fixedly connected by the light tube locking nut.

2. The firework light according to claim 1, further comprising second connecting assemblies, wherein the second connecting assembly comprises a first connector, a second connector, a sealing ring and a fixed nut, the first connector and the second connector are detachably and fixedly connected, the sealing ring is arranged at the joint of the first connector and the second connector, and the fixed nut sleeves the outside of the first connector.

3. The firework light according to claim 2, wherein a plurality of first connectors are provided, the first connectors are integrated into the accommodating cavity inside the housing to form a light strip connecting assembly, and the second connector is arranged corresponding to the first connector.

4. The firework light according to claim 3, wherein an input male plug connector is arranged at one end of the light strip connecting assembly, the input male plug connector is detachably and fixedly connected with one end of a master control female plug connector, the other end of the master control female plug connector is connected with one end of a transformer through a controller, and the other end of the transformer is connected with a power supply.

5. The firework light according to claim 4, further comprising a mounting assembly, wherein the mounting assembly is fixedly arranged outside the housing, and an opening communicating with the accommodating cavity inside the housing is formed in the mounting assembly.

* * * * *